United States Patent Office 3,759,777
Patented Sept. 18, 1973

---

3,759,777
PROCESS FOR PRODUCING REINFORCED
PLASTIC LAMINATES FROM POLYDIENE
BLOCK POLYMERS
Hyman R. Lubowitz, Hawthorne, Richard S. Thorpe, Costa Mesa, and Robert W. Vaughan, Manhattan Beach, Calif., assignors to TRW Inc., Redondo Beach, Calif.
No Drawing. Filed Jan. 20, 1971, Ser. No. 108,174
Int. Cl. B32b 27/32, 27/38
U.S. Cl. 156—330                                         3 Claims

ABSTRACT OF THE DISCLOSURE

Laminated structures comprising a plurality of resin impregnated bonded fabric sheets are made by curing a chain extended polydiene and anhydride adduct impregnant in the presence of a peroxide free radical initiator. Hydroxy, amino, or mercapto terminated 1,2-polybutadine or 3,4-polyisoprene is reacted with an organic acid anhydride to produce a polydiene carboxylic acid terminated adduct which is chain extended and subsequently cured with a peroxide.

---

Many laminated structures which exhibit excellent dry physical properties demonstrate catastrophic mechanical property degradation after water boil. Glass fabric laminates using phenolics or some polyesters tend to degrade after water boil. The degradation apparently arises from the inability of the resin to seal the fibers adequately from moisture, and thus the moisture penetrates the laminate through the interface of fibers and matrix by capillary action.

Other laminates made with resins such as selected epoxy, silicon, fluorocarbon, and polyesters exhibit excellent water boil characteristics, however, some of the mechanical and chemical properties of the laminates are not entirely satisfactory. Silicon and fluorocarbon resins exhibit generally inferior mechanical properties while their chemical properties are satisfactory or superior in some instances. On the other hand, epoxy and polyester resins demonstrate good to superior mechanical properties while resistance to strong chemicals is frequently less than satisfactory.

The present invention overcomes many of the deficiencies of the prior art laminates. Laminates according to the present invention provide stable prepregs, control of tack, drape, and flow, as well as excellent mechanical and electrical properties while retaining substantially 100 percent strength retention after a two-hour water boil. These attractive properties are achieved by the use of a 1,2-polydiene epoxy block polymer described in the copending application Ser. No. 64,611, filed Aug. 17, 1970.

Resins used for the laminates of this invention are prepared by the chain extension of a carboxylic acid terminated polydiene adduct. The polydiene adduct is prepared by reacting a hydroxy, amino, or mercapto terminated 1,2-polybutadiene or 3,4-polyisoprene with an organic acid anhydride in a solvent. The polydiene, i.e. the 1,2-polybutadiene or the 3,4-polyisoprene, should have a predominant amount, or at least 50% of the olefinic unsaturation comprising the 1,2- or pendant vinyl group configuration, and preferably the vinyl unsaturation should comprise at least 80% of the olefinic unsaturation. Although the polydiene and certain anhydrides will react at room temperature, temperatures of approximately 65°–110° C. reduce the viscosity of the polydiene and expedite the mixing and reaction of the polydiene with the anhydride.

Suitable organic anhydrides which can be reacted with the difunctional polydiene typically include:

TABLE I trimellitic anhydride
hexahydrophthalic anhydride
nadic anhydride
methyl nadic anhydride
oxalic anhydride
malonic anhydride
azelaic anhydride
adipic anhydride
tetrachlorophthalic anhydride
tetrabromophthalic anhydride
pimelic anhydride
tetrahydrophthalic anhydride
chlorendic anhydride
maleic anhydride
succinic anhydride
suberic anhydride
sebacic anhydride
glutaric anhydride
phthalic anhydride In another method, the terminally difunctional polydiene may be reacted with a controlled amount of an organic dianhydride to produce a polycarboxylic acid adduct. In this reaction, it is desirable to employ an equivalent amount of the dianhydride for the formation of polycarboxylic acid adduct, however, an amount of dianhydride in excess of equivalence may be used when adducts having reduced viscosities are sought. Typical dianhydrides which are suitable for use are:

TABLE II (1) 3,3′,4,4′-benzophenone tetracarboxylic dianhydride
(2) polyazelaic polyanhydride
(3) pyromellitic dianhydride
(4) pyromellitic dianhydride-glycol adducts
(5) 1,2,3,4-cyclopentanetetracarboxylic dianhydride The chain extended elastomeric intermediate is formed by the reaction of the dicarboxylic acid adduct with an organic chain extender. The adduct and the chain extender are mixed together and reacted at temperatures ranging from 50°–120° C. As in the previous step the higher temperature reduces the viscosity of the adduct and permits better mixing. Upon completion of the mixing, the temperature is maintained for five minutes to several hours depending upon the presence of catalyst, the temperature of the polymer, the mass of the material being chain extended, and the degree of the chain extending desired.

Chain extending of the dicarboxylic acid adduct to form an elastomeric material is achieved by the reaction of the adduct with an aliphatic or aromatic substituted compound selected from polyfunctional epoxides, imines, imides, alcohols, aziridines, or mercaptans. By polyfunctional it is meant that the aliphatic or aromatic compound has more than one reactive group attached to the molecule. Monofunctional compounds may be employed to regulate the molecular weight of the chain extended dicarboxylic adduct. The chain extension is accomplished by mixing the ingredients under relatively moderate conditions. Chain extension can occur at room temperature, however, the time required for the step is materially reduced by increasing the temperature to a range of approximately 50°–120° C. The chain extension reaction may be further accelerated by the inclusion of catalysts.

Examples of polyepoxide chain extenders include the following:

TABLE III (1) epoxy novalacs
(2) bis-epoxydicyclopentyl ether of ethylene glycol
(3) epichlorohydrin/bisphenol A-type
(4) 1-epoxyethyl-3, 4-epoxycyclohexane
(5) dicyclopentadiene dioxide
(6) limonene dioxide
(7) bis (2,3-epoxypropoxy)benzene
(8) vinylcyclohexane dioxide
(9) 3,4-epoxy-6-methylcyclohexylmethyl-3,4-epoxy-6 methylcyclohexanecarboxylate
(10) zeaxanthin diepoxide
(11) 9,10-epoxy-12-hydroxyoctadecanoic acid triester with glycerol.

Suitable polyimine or polyimide chain extenders include the following:

TABLE IV (1) 1,6-hexane,-N,N'-diethylenimine
(2) 1,6-hexane,-N,N'-dipropylenimine
(3) 1,7-heptane,-N,N'-diethylenimine
(4) 1,7-heptane,-N,N'-dipropylenimine
(5) 1,8-octane,-N,N'-diethylenimine
(6) 1,8-octane,-N,N'-dipropylenimine
(7) 1,3-di-(carboxy-N-propylenimide) benzene
(8) 1,3,5-tri (carboxy-N-propylenimide) benzene
(9) 1,3-di (ethylene-N-1,2-butylimine) benzene The peroxide free radical initiator may be incorporated into the chain extended elastomer in either of two ways; in one way the peroxide may be milled into the elastomer after the chain extension step, while in an alternative method the peroxide may be incorporated into the liquid polydiene prior to chain extension. Either method effects the same end result, viz, a chain extended elastomer having the peroxide free radical initiator homogeneously dispersed therethrough substantially unreacted, however, preference may depend upon the processing equipment available. The amount of peroxide employed is generally in the range of between approximately 0.5%–10% by weight of the polymer however these amounts are not too critical, inasmuch as amounts of peroxide above 10% will be operative, however, such large amounts of peroxide are undesirable from an economic standpoint. Amounts of peroxide below 0.5% will effect a reaction, however, the reaction is usually sluggish and sometimes the product does not have the optimum properties attainable. Other factors dependent upon the amount of peroxide used may be the particular peroxide compound used, the polydiene, the anhydride, and the chain extenders selected for the reaction. Thus, when the peroxide is heated in the range of approximately 150°–220° C. the peroxide is activated and the elastomer is cured to a very hard thermoset resin having a shrinkage of less than 7 mils per inch and improved machinability. Organic peroxide free radical initiators suitable for use in this process may be selected from the following:

TABLE V (1) di-t-butyl peroxide
(2) 2,5-dimethyl-2,5-bis(tertiary butylperoxy) hexane
(3) n-butyl-4,4-bis(tertiary butylperoxy) valerate
(4) 2,5-dimethyl-2,5-bis (tertiary butylperoxy) hexyne-3
(5) tertiary-butyl perbenzoate
(6) dicumyl peroxide
(7) methyl ethyl ketone peroxide
(8) cumene hydroperoxide
(9) di-N-methyl-t-butyl percarbamate
(10) lauroyl peroxide
(11) acetyl peroxide
(12) decanoyl peroxide
(13) t-butyl peracetate
(14) t-butyl peroxyisobutyrate The idealized overall reaction for the preparation of resins of this invention using 1,2-polybutadienediol, tetrahydrophthalic anhydride and 4,4'-isopropylidenediphenol is as follows:

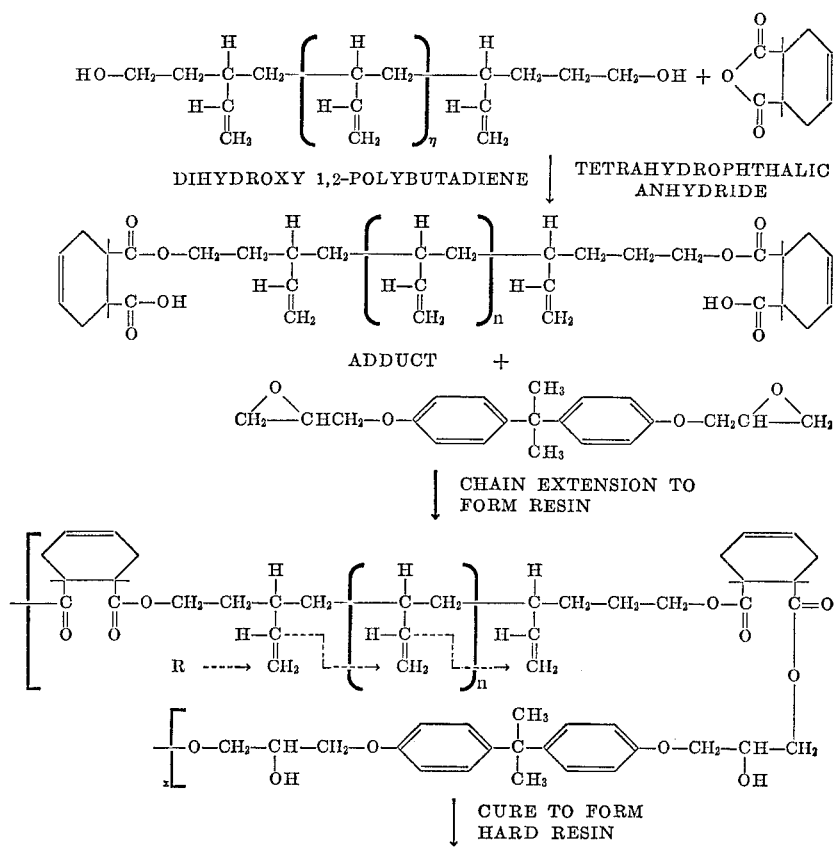

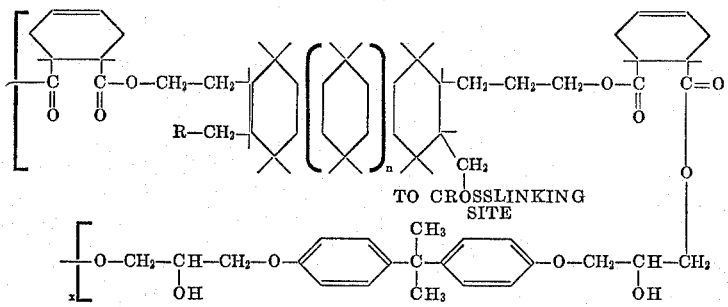

In the first reaction between the polybutadienediol and the anhydride, the functionally active hydroxyl terminal groups on the polybutadiene react with the anhydride to form a dicarboxylic acid adduct. When the epichlorohydrin/bisphenol-A is reacted with the adduct, the adduct is chain extended whereby an elastomer is formed. With the application of heat in the third reaction, the peroxide initiator decomposes to provide a free radical which promotes the cyclization of the pendent vinyl groups of the polydiene and the crosslinking of adjacent chains. In the foregoing equation, $n$ typically represents an integer sufficiently high to provide an average molecular weight corresponding to the polydiene used, and $x$ is a sufficiently high integer to provide a hard, cross-linked product.

Laminating varnishes used in this invention were formed by blending together the polydiene adduct, epoxy resin, and peroxide catalyst according to formulations calculated using the following equation:

$$a = \frac{(f)(b)(100)(d)(e)}{(c)}$$

where:

$a$ = parts by weight of epoxy resin per 100 grams of polydiene adduct solution.
$b$ = weight fraction of adduct solution consisting of anhydride employed in preparing adduct.
$c$ = molecular weight of anhydride.
$d$ = number of epoxy reactive groups in adduct per anhydride.
$e$ = epoxide equivalent weight of epoxy resin.
$f$ = equivalents ratio of epoxide to anhydride.

Reinforcing materials can be selected from a large variety. Because of the relatively high temperature cure, consideration should be given to the temperature limitations as well as to the tensile strength when selecting the reinforcing material. Generally, the reinforcing materials should be able to withstand temperatures of at least 500° C. Examples of a few of the materials which would be suitable for use in the present invention includes asbestos; carbon; structural metals, such as aluminum, steel magnesium, tungsten, or titanium; plastics, such as polyimides, polyesters, or polybenzimidazoles; and glass. These mtaerials can be applied as fabrics, mats, non-woven continuous filaments, or non-woven non-continuous fibers.

Preparation of the prepregs is accomplished by applying the liquid varnish to the adherend or reinforcing material. The liquid varnish is applied to the material by dipping, spraying, or brushing, and after the excess varnish is removed, the adherends are placed in mildly heated air, e.g., an air circulating oven, to form an elastomer by chain extending the components in the liquid varnish.

Laminating processes depend somewhat upon the article being made. Manufacturers of flat reinforced plastics, such as electrical and industrial sheeting, generally mold laminates by stacking many sheets into a single press. During this molding process, the laminates are separated by either sub-platens as in a multi-daylight press or by thin metal caul sheets. Stacked prepregs usually are loaded into a cold press, pressure is applied, and the temperature is raised to the required level for curing.

Vacuum bag molding is used generally for fabricating components too large or otherwise economically unfeasible for press molding. This process employs the technique of evacuating the air from within a flexible membrane sealed over an uncured prepreg lay-up imparting approximately 15 p.s.i. applied pressure to the part. Typical applications for this technique are in fabricating aircraft structures, such as randomes for which the design demands both high performance mechanical and electrical properties. Either molding process is suitable for preparation of the invention.

For a better understanding of the present invention, the following examples are set forth to illustrate specific embodiments.

PREPARATION OF ADDUCTS

Trimellitic anhydride (TMA)

Approximately 100 grams of hydroxy terminated 1,2-polybutadiene, mol. wt. 1000, and 27.3 grams of trimellitic anhydride recrystallized from methyl ethyl ketone were placed in a one-liter glass resin kettle fitted with a mechanical stirrer, a thermometer, a reflux condenser, and a heating mantle. The mixture was stirred and heated for 10 minutes at 70° C., at which time 127.3 grams of acetone was carefully added. The mixture was stirred at 62° C. for 3 hours to give a clear solution which became cloudy upon cooling to room temperature.

Pyromellitic dianhydride (PMDA)

Approximately 352 grams of hydroxy terminated 1,2-polybutadiene, mol. wt. 1000, and 109.1 grams of pyromellitic dianhydride were placed in a 2-liter apparatus equipped as described above. The mixture was heated to 72° C. with stirring, where upon 46.1 grams of acetone was added carefully, followed by the addition of 4.6 grams of trimethyl amine. This mixture was refluxed for one hour to give a yellow-green, cloudy solution.

Laminating varnishes were formulated according to the above equation. Specific formulations were as follows:

TABLE VI

| Formulation number | Parts by weight | | | | |
|---|---|---|---|---|---|
| | TMA adduct | PMDA adduct | Epoxy | Dicumyl peroxide | Acetone |
| 1 | 100 | | [1] 26.5 | 3.7 | 63 |
| 2 | 100 | | [2] 24 | 3.7 | 132 |
| 3 | 100 | | [3] 28.5 | 3.7 | 73 |
| 4 | | 100 | [1] 25.5 | 3.7 | 136 |
| 5 | | 100 | [2] 23 | 3.7 | 128 |
| 6 | | 100 | [3] 27 | 3.7 | 139 |

[1] Shell Epon 828 (bisphenol A/diglycidyl ether).
[2] Dow DEN 438 (novalac-epoxy).
[3] Shell Epon 1031 (polyglycidyl ether of tetraphenylene ethane).

Panels of glass fabrics were precut into 12 inch by 30 inch pieces, and one end was stapled around a metal rod. Varnish was poured into 12-inch square Mylar trays, and the glass fabric was immersed in the varnish. Excess resin was removed from the fabric by slowly drawing the prepreg through half-inch diameter squeeze bars set at 0.017 inch gap. The prepregs were placed in an air circulating oven for the following times with the following results:

TABLE VII

| Formulation number | Staging cycle Temperature, °C. | Time, minutes | Drapability | Tack |
|---|---|---|---|---|
| 4E | 65 | 10 | Good drape | Tacky. |
| 4A | 65 | 10 | do | Do. |
| 5E | 65 | 8 | Boardy | Dry. |
| 5A | 65 | 8 | do | Dry. |
| 6E | 65 | 5 | do | Dry. |
| 6A | 65 | 5 | do | Dry. |
| 1E | 121 | 10 | Good drape | Tacky. |
| 1A | 121 | 10 | do | Do. |
| 2E | 121 | 5 | Medium drape | Slight tack. |
| 2A | 121 | 5 | do | Do. |
| 3E | 121 | 10 | Boardy | Dry. |
| 3A | 121 | 10 | do | Dry. |

NOTE.—E=epoxy silane coupling agent. A=amino silane coupling agent.

Prepreg panels prepared according to Formulation 3E as described above were cut into 4 by 6 inch pieces. These pieces were then laid-up into four stacks of 13 plies each with a 0.020 inch thick metal caul sheet separating each stack. This assembly was placed onto an unheated lower platen of a laboratory press and 300 p.s.i.g. pressure was applied. The temperature of the electrically heated platens was raised to 175° C. at a heat-up rate of about 5.5° C. per minute and held for 30 minutes. Upon completion of this cure cycle, the laminates were removed from the press while still hot and identified sequentially starting with panel No. 1 at the bottom. Properties of the laminates are set forth in the following table.

TABLE VIII

| Property | 1 | 2 | 3 | 4 |
|---|---|---|---|---|
| Flexural strength: | | | | |
| At room temperature, k.s.i. | 78.8 | 72.5 | 72.2 | 69.2 |
| After 2 hours water boil, k.s.i. | 73.7 | 66.7 | 71.9 | 62.1 |
| Percent retention | 93 | 92 | 99 | 90 |
| At 150° C., k.s.i. | 44.5 | 37.3 | 37.0 | 38.1 |
| Percent retention | 58 | 52 | 51 | 55 |
| Flexural modulus: | | | | |
| At room temperature, m.s.i. | 4.0 | 3.8 | 3.7 | 3.9 |
| After 2 hours water boils, m.s.i. | 3.7 | 4.0 | 3.7 | 4.1 |
| Percent retention | 93 | 106 | 100 | 105 |
| At 150° C., m.s.i. | 3.7 | 2.8 | 3.2 | 3.5 |
| Percent retention | 93 | 74 | 87 | 90 |
| Resin content, percent w/w | 20 | 21 | 22 | 21 |

Two prepreg panels 8 by 12 inches and stacked 13 plies thick were prepared for vacuum-bag molding. Pieces of 0.002 inch thick Mylar film 8 by 12 inches coated with a fluorocarbon mold release agent were applied to the top and the bottom of the prepreg stack. This assembly was placed on a steel plate and three layers of dry glass fabric, 1 inch wide, were placed around the periphery of the prepreg lay-up as a resin bleeder. Two rubber hoses were installed in the bleeder fabric at opposite corners, and a nylon film, 0.002 inch thick, was placed over the assembly and was sealed to the steel base plate with vacuum bag sealer. Properties of the laminates are set forth in the following table.

TABLE IX

| Property | Value, laminate resin system Formulation No. 2 | Formulation No. 2* |
|---|---|---|
| Flexural strength: | | |
| Initially, k.s.i. | 80.4 | 107.8 |
| After 2 hours water boil, k.s.i. | 79.9 | 82.1 |
| Strength retention, percent | 99 | 76 |
| Flexural modulus: | | |
| Initially, m.s.i. | 2.4 | 3.83 |
| After 2 hours water boil, m.s.i. | 2.2 | 3.74 |
| Modulus retention, percent | 89 | 97 |
| Resin content, percent w./w. | 29 | 24 |

*Hydroxy terminated 1,2-polybutadiene, molecular weight 2,000 used.

Typical electrical properties were as follows:

TABLE X

| Property | G-10 NEMA* requirements | Formulation No. 6 (2,000 mol. wt.) | Formulation No. 6 |
|---|---|---|---|
| Arc resistance, ASTM D-495: | | | |
| Avg. time, secs | | 186 | 183 |
| Min. time, secs | [4] 180 | 185 | 183 |
| Remarks | | Tracked | Tracked |
| Dielectric constant: | | | |
| 60 Hz: | | | |
| Dry | [3] 5.3–5.4 | 5.6 | 5.6 |
| Wet | [3] 5.3–5.4 | 5.7 | 5.8 |
| 10 MHz: | | | |
| Dry | 5.4 max. | 4.67 | 5.25 |
| Wet | 5.8 max. | 4.67 | 6.29 |
| 9.375 GHz: | | | |
| Dry | [2] 4.6 max. | 5.6 | 5.6 |
| Wet | [2] 4.6 max. | 5.7 | 5.8 |
| Dissipation factor: | | | |
| 60 Hz: | | | |
| Dry | [3] 0.004–006 | 0.003 | 0.005 |
| Wet | [3] 0.004–0.006 | 0.019 | 0.025 |
| 10 MHz: | | | |
| Dry | 0.035 max. | 0.0050 | 0.003 |
| Wet | 0.045 max. | 0.0074 | 0.019 |
| 9.375 FHz: | | | |
| Dry | [2] 0.020 | 0.0038 | 0.005 |
| Wet | | 0.025 | 0.0067 | 0.025 |
| Volume resistivity: | | | |
| Surface, ohm | $1.0 \times 10^{11}$ | $8.5 \times 10^{14}$ | $4.0 \times 10^{15}$ |
| Volume, ohm | $1.0 \times 10^{9}$ | $8.5 \times 10^{14}$ | $4.0 \times 10^{15}$ |
| Dielectric strength: | | | |
| Short time | [1] >55/ST | [1] >55/ST | [1] 55/ST |
| 25 kv | | [1] >55/420 | [1] 55/>420 |

[1] Breakdown voltage, KV/time at breakdown, seconds.
[2] MIL-R-9300 A requirements.
[3] Typical commercial values.
[4] Minimum.
* National Electrical Manufacturers Association.

From the foregoing examples, it can be seen that laminate end properties can be tailored to specific applications by control of the molecular weights of the constituents, the stochiometric levels of the constituents, and the constituents selected. Additionally, it can be seen the end properties of the laminates of this invention are as good or better than most epoxy resins with excellent wet strength retention and good electrical and mechanical properties. These attractive features are enhanced further by the fact that these laminates can be processed on equipment commonly used for the production of laminates.

What is claimed is:

1. A process of bonding a plurality of sheets together comprising:
    (a) forming an adhering elastomeric coating on at least one surface of said sheets, said elastomeric coating comprising the reaction product of
        (1) a polyidene having (i) polyfunctional groups selected from the group consisting of hydroxyl, amino, and mercapto and (ii) a predominant amount of the olefinic unsaturation comprising pendant vinyl groups on alternate carbon atoms of the polydiene backbone chain; and (2) an organic acid anhydride forming a carboxylic acid terminated adduct, which adduct then reacts with (3) an organic chain extender selected from the group consisting of polyepoxides, polyimides, polyimines, polyols, polyaziridines, and polymercaptans, said reaction product having (4) a peroxide free radical initiator dispersed therethrough substantially unreacted;
    (b) bringing the sheets into engagement with the rubber coating therebetween; and
    (c) curing to produce a tenacious bond of hard thermoset resin.

2. A process according to claim 1 wherein the polydiene is selected from the group consisting of 1,2-polybutadiene and 3,4-polyisoprene.

3. A process according to claim 1 wherein the organic acid anhydride is selected from the group consisting of trimellitic anhydride, tetrahydrophthalic anhydride, hexahydrophthalic anhydride, tetrachlorophthalic anhydride, tetrachlorophthalic anhydride, tetrabromophthalic anhydride, chlorendic anhydride, nadic anhydride, maleic anhydride, oxalic anhydride, succinic anhydride, malonic anhydride suberic anhydride, azelaic anhydride, sebacic anhydride, adipic anhydride, glutaric anhydride, pimelic anhydride, phthalic anhydride, 3,3′,4,4′-benzophenone tetracarboxylic dianhydride, polyazelaic polyanhydride, pyromellitic dianhydride, 1,2,3,4-cyclopentane tetracarboxylic dianhydride, and endo-cis bicyclo (2.2.1)-5-heptene-2,3-dicarboxylic dianhydride.

References Cited

UNITED STATES PATENTS

| | | | |
|---|---|---|---|
| 3,616,193 | 10/1971 | Lubowitz et al. | 161—190 |
| 3,528,878 | 9/1970 | Lubowitz et al. | 161—188 |
| 3,515,772 | 6/1970 | Lubowitz et al. | 260—836 |
| 3,507,831 | 4/1970 | Avis et al. | 161—184 X |
| 3,519,604 | 7/1970 | Maurer | 161—184 X |
| 3,546,041 | 12/1970 | Burns et al. | 156—308 |
| 3,582,459 | 6/1971 | Tucker et al. | 161—217 |
| 3,635,891 | 1/1972 | Lubowitz et al. | 260—859 R |

HAROLD ANSHER, Primary Examiner

U.S. Cl. X.R.

156—332, 334; 161—182, 184, 188, 217, 219, 253, 255